Feb. 3, 1942. H. A. HUEBOTTER 2,271,766
ENGINE
Filed May 6, 1940 4 Sheets-Sheet 1
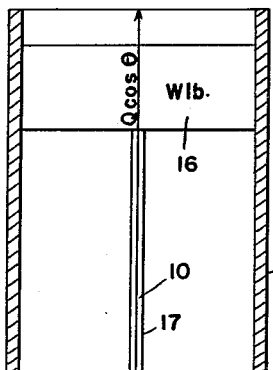
FIG.1.
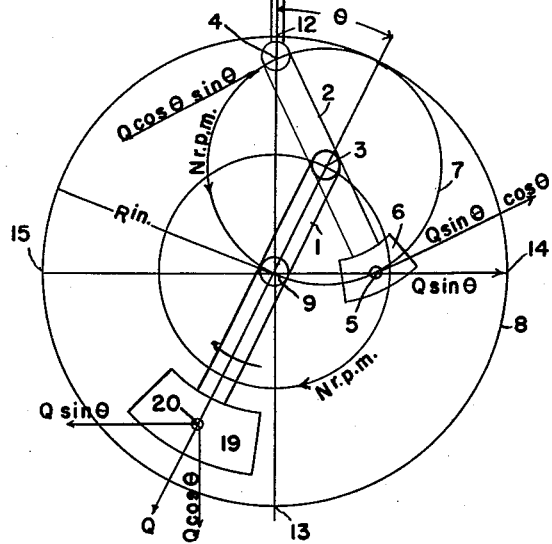
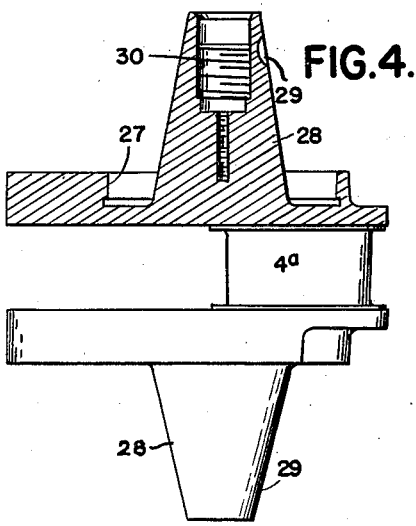
FIG.4.
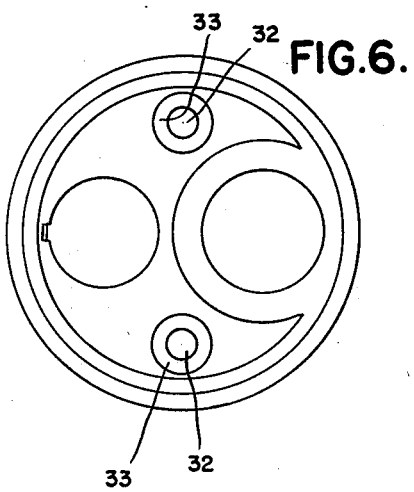
FIG.6.
FIG.5.
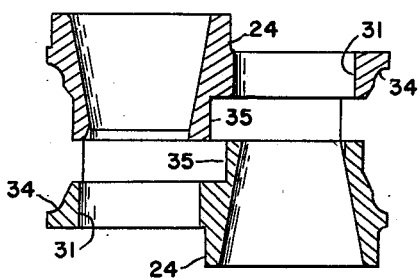
INVENTOR.
HARRY A. HUEBOTTER
BY *Swan, Frye & Hardesty*
ATTORNEYS Feb. 3, 1942.   H. A. HUEBOTTER   2,271,766
ENGINE
Filed May 6, 1940   4 Sheets-Sheet 2

INVENTOR.
HARRY A. HUEBOTTER
BY
ATTORNEYS

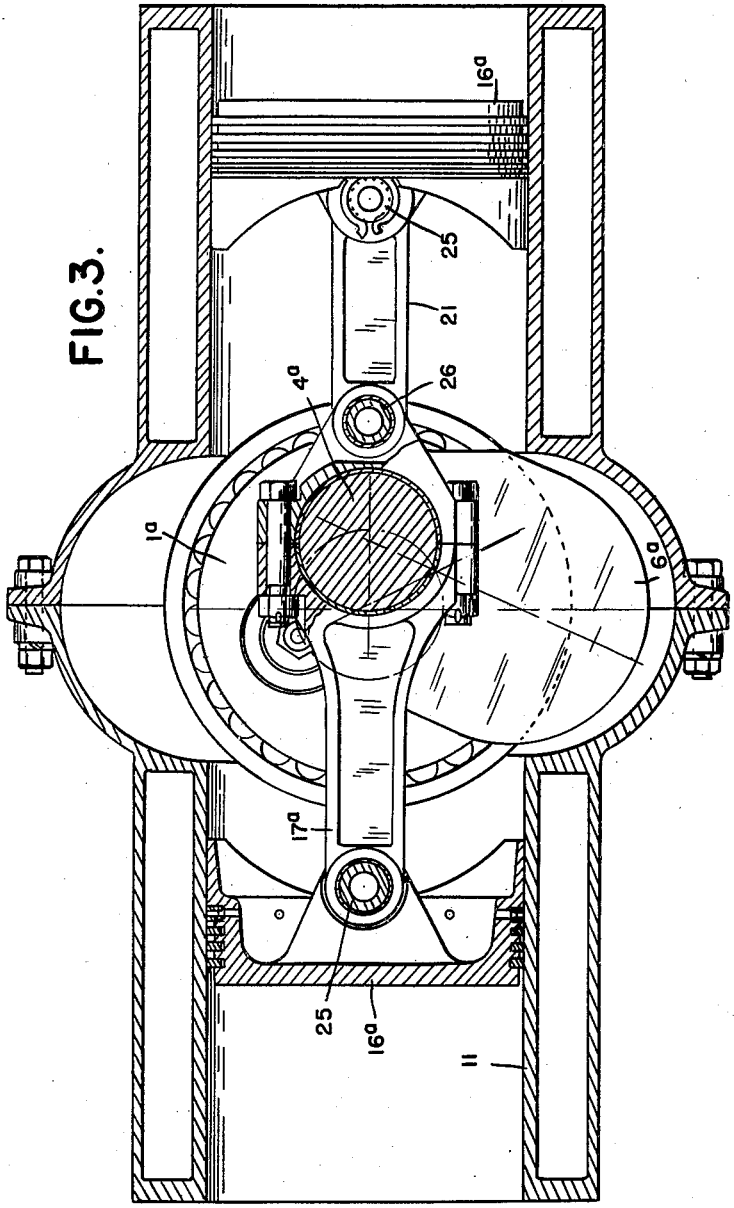

Patented Feb. 3, 1942

2,271,766

UNITED STATES PATENT OFFICE 2,271,766

ENGINE

Harry A. Huebotter, Flint, Mich.

Application May 6, 1940, Serial No. 333,618

9 Claims. (Cl. 74—604)

The present invention relates to improvements in crank combinations whereby rotary motion and reciprocating linear motion are mutually convertible. In a more specific aspect this invention pertains to the crank, piston, and connecting rod assembly of a reciprocating engine or pump.

The primary concept in this invention is a single cylinder unit in which the dynamic forces and torques induced by the motion of a crank, piston, and connecting rod are completely cancelled by a system of counterweights properly applied and proportioned.

One object of this invention is to incorporate in a simple and durable mechanical movement, the means for constructing engine or pump assemblies of any number of cylinders in any arrangement of cylinders, which will necessarily be in dynamic force, couple, and torque balance since each cylinder is individually in balance.

A second object is to permit a design in which both the maximum and the mean crankpin bearing loads are low in comparison with the loads inherent in the conventional crank and connecting rod mechanism.

A third object is to permit a compact assembly by eliminating the consideration of connecting-rod angularity.

A fourth object is to permit a short and therefore lightweight piston by removing the piston side-thrust incidental to connecting rod angularity.

A fifth object is to eliminate synchronous torsional vibrations in the power shaft of multiple cylinder engines.

A sixth object is to permit a power stroke at 180 degree intervals in a balanced twin-cylinder two cycle engine with opposed cylinders.

These several objects are all especially pertinent to light-weight high-speed internal combustion engines in which the dynamic forces represent one of the major considerations in the design.

Certain advantages that accrue from the application of this invention to specific installations will appear in the course of the specification.

Two serious objections to the slider-crank mechanism of the conventional engine arise from the angularity of the connecting rod. The magnitude of the side-thrust on the cross-head requires adequate bearing surface and lubrication in order to avoid excessive wear. The reversal in direction of the side thrust requires a close fit between the cross-head and its guide to reduce noise at the time of reversal.

The motion of the cross-head is so complicated by the angularity of the connecting rod as to make the problem of completely neutralizing the dynamic force due to the inertia of the cross-head, extremely difficult. The cross-head derives its motion simultaneously from the rotation of the crank about its own axis and from the oscillation of the connecting rod about the axis of the wrist pin in the cross-head. The direct effect of the crank rotation upon the cross-head motion is a harmonic of the same frequency as the crank. The component of the cross-head motion caused by the connecting rod oscillation may be defined mathematically by an infinite series of harmonics of increasing frequency and decreasing amplitude.

The force acting parallel to the longitudinal axis of the cylinder, and the torque acting about the rotational axis of the crank resulting from the inertia of the reciprocating members can likewise be expressed mathematically by an infinite series of harmonic terms of ascending frequency beginning with crankshaft frequency. Certain arrangements of the cylinders and cranks permit some components of the dynamic forces and torques to be self-neutralizing in the complete engine, but those harmonics that are not neutralized are cumulative and induce engine vibration and dangerous crankshaft stresses.

The principle underlying my invention is elementary. I use the well-known hypocycloidal straight-line motion for the crankpin, and thereby impart to the cross-head a simple harmonic motion, which permits the balancing of all dynamic forces and torques by simple means.

The principle and its application may be readily understood by reference to the accompanying illustrations in which Figure 1 is a force diagram developed for purposes of mathematical discussion.

Figuer 2 is a longitudinal section of four cylinders with the assembled reciprocating mechanisms, taken in general through the axes of the four cylinders and of the cranks.

Figure 3 is a transverse section of the engine in Figure 2, taken through the longitudinal axes of a pair of opposed cylinders in the plane normal to the crankpin axis, as on line 3—3 of Figure 2.

Figure 4 is a detail of an auxiliary crankshaft which contains the crankpin.

Figure 5 is a detail of the two halves bolted together, of a main eccentric which carries the auxiliary crankshaft.

Figure 6 is a bottom view of the upper member of the pair shown in Figure 5.

Similar numerals refer to similar parts in all of the illustrations.

Figure 2:
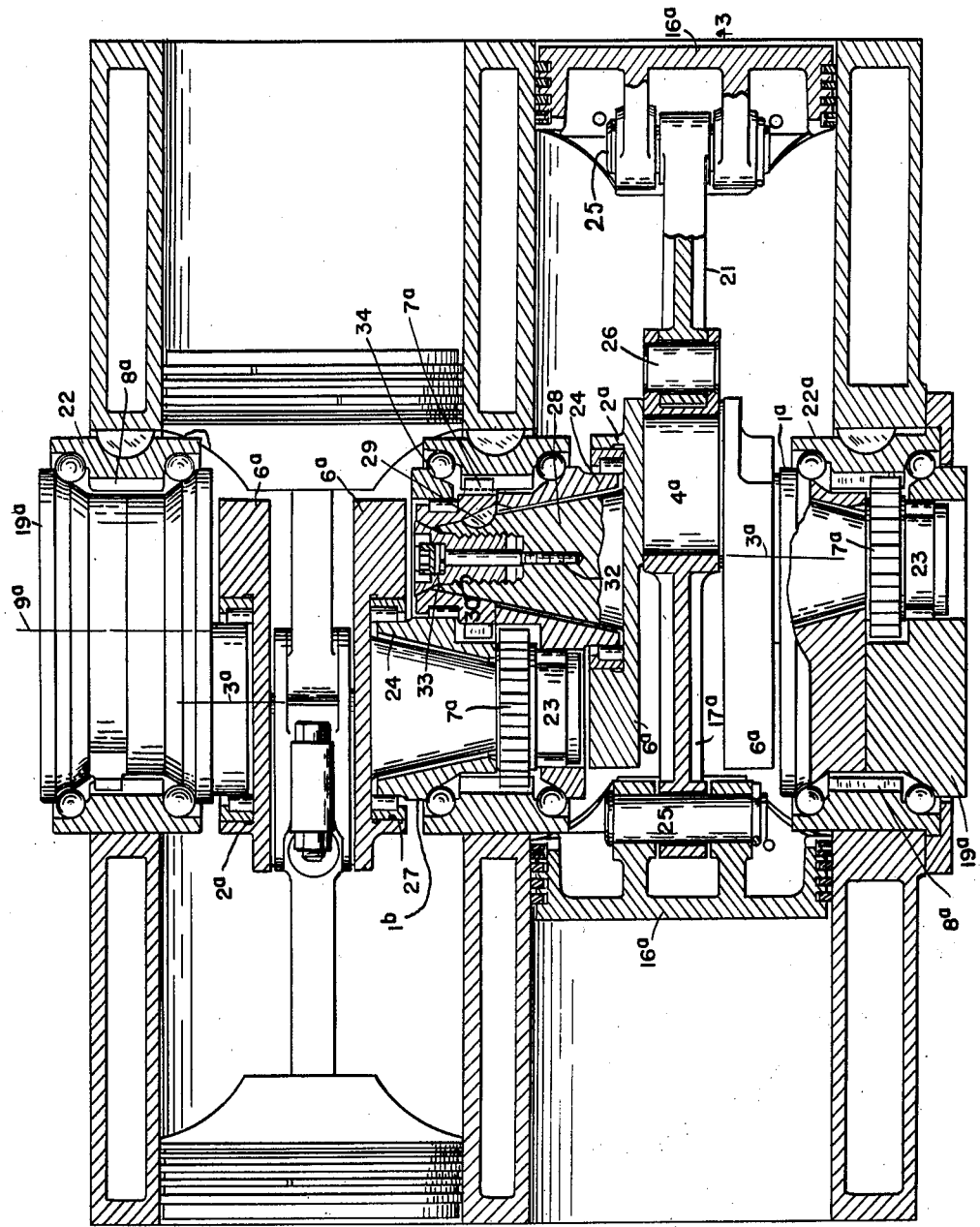

The essential principle of this invention is that the hypocycloid described by a point on the circumference of a circle rolling within a fixed circle whose radius is equal to the diameter of the rolling circle represents a simple harmonic motion, the path of which is a diameter of the fixed circle. I use this simple harmonic motion in three ways, namely:

1. To convert the reciprocating motion of the piston into rotary motion of the main crank, and vice versa.
2. To enable counterweights on the auxiliary crank to neutralize the inertia torque induced by the piston and the connecting rod.
3. To permit a counterweight on the main crank to neutralize the reciprocating forces induced by the piston, the connecting rod, and the auxiliary counterweight.

Referring to Figure 1, the main crank 1, which has a radius of 0.5 R inch, rotates in the clockwise direction about axis 9 at a speed of N revolutions per minute. It carries the auxiliary crank 2, which has also a radius of 0.5 R inch and which rotates in the counterclockwise direction relative to crank 1 about the axis 3 at a speed of N R. P. M. The axis of the crankpin 4 and the centroid 5 of the auxiliary counterweight 6 lie on the circumference of the circle 7 which is concentric with the axis 3. The circle 8, concentric with the axis 9, has the radius R inches. Then the axis of the crankpin 4 describes the hypocycloid 12—13 which is a diameter of circle 8 co-linear with axis 10 of cylinder 11. The centroid 5 describes the hypocycloid 14—15, a diameter of circle 8 normal to 12—13. The motion of the crankpin 4 is communicated to piston 16 by the trunnioned connecting rod 17. In practice, the rolling circle 7 is the pitch circle of a pinion which is rigidly attached to the auxiliary crankshaft 2. The fixed circle 8 is the pitch circle of an internal gear mounted in the engine frame.

The piston 16 and the auxiliary counterweight 6 reciprocate with alternate acceleration and deceleration in accordance with an harmonic law, the expression of which depends upon the reference variable. For the present purpose, the angle of rotational displacement $\theta$ for the main crank 1, with its origin on the radius 9—12 will be the independent quantity to which all dynamic forces are referred. Then the inertia force induced by the acceleration of the reciprocating parts which move with the crankpin 4 is equal to $Q \cos \theta$ pounds, where Q is equal to $0.0000284\ N^2WR$ pounds. The mass W pounds refers to the crankpin 4 and all parts that reciprocate with the crankpin.

Inertia torque balance is obtained by letting the mass of counterweight 6 be W pounds also. The inertia force of the counterweight acting on the path 14—15 is equal to $Q \sin \theta$ pounds, being 90 degrees out of phase with the inertia force along the line of action 12—13. Positive inertia forces act upward and toward the right.

The tangential force applied at the circumference of the circle 7 for the acceleration of the reciprocating parts that are actuated by the crankpin 4 is supplied by the inertia of the counterweight 6. The component of $Q \cos \theta$ acting normally to the auxiliary crank 2 at 4 is equal to $-Q \cos \theta \sin \theta$ pounds, where the negative sign represents a force that opposes the rotation of circle 7. The component of $Q \sin \theta$ normal to crank 2 is equal to $Q \sin \theta \cos \theta$ pounds promoting the rotation of circle 7. The dynamic torque induced by the reciprocating members is therefore balanced in the auxiliary crank 2. It is obvious that complete cancellation of the dynamic torque requires precision in the mass and the position of the counterweight 6.

The counterweight 19 is applied to the main crank 1 with its centroid 20 diametrically opposite the axis 3. The counterweight 19 must primarily balance the parts that rotate with the main crank 1, and in addition must have the static moment equal to WR pound inches which is necessary to exert the excess centrifugal force of Q pounds radially in the direction 9—20. The component $Q \cos \theta$ pounds parallel to the diameter 12—13 exactly balances the dynamic force exerted by the reciprocating parts, and the component $Q \sin \theta$ pounds parallel to the diameter 14—15 balances the force exerted by counterweight 6. The single-cylinder unit is therefore in complete dynamic force and torque balance.

The longitudinal assembly in Figure 2 shows one application of the balancing principle analyzed above. Although only four cylinders are illustrated, more cylinders may be added, for the number is limited only by the ability of the cranks to transmit the fluid torque of the entire power plant.

In this design, the main crank 1 of Figure 1 is replaced by the functionally equivalent eccentrics 1a and 1b for the structural purposes. These eccentrics rotate about the axis 9a in bearings whose outer races are numbered 22 and 22a. The auxiliary cranks 2a revolve about the axes 3a in bearings whose inner races are numbered 23 and 24. The auxiliary cranks carry the pinions 7a which mesh with the internal gears 8a integral in this design with the ball races 22 and 22a. The crankpin 4a actuates the pistons 16a through the master connecting rod 17a and the link 21. The flexibility in the connecting means between the crank 2a and the pistons 16a is provided in order to avoid the necessity for absolute precision in machining and assembling the mechanism. Under mathematically ideal conditions, a rigid assembly of pistons and connecting rods is possible, but practically the inclusion of the piston pins 25 and the pivot pin 26 is advisable.

In this cylinder arrangement the reciprocating forces due to the inertia of the pistons and of the counterweights 6a are self-neutralizing as regards their tendency to cause translatory vibration. Owing to the fact that the forces are not colinear, however, vibrating couples are introduced, which are cancelled by the couples developed by the counterweights 19a integral with the end eccentrics. Torsional vibration is avoided by the absence of inertia torque and by the discontinuity of the crank assembly.

The transverse section in Figure 3 presents certain design features that are not apparent in Figure 2. The possibilities of compact design are especially evident, for even large counterweights on the auxiliary crank 2a require little elongation of the cylinder block, and the short connecting rod is made possible by the linear motion of the crankpin 4a.

The auxiliary crank 2a is shown in detail in Figure 4. Attention is called to the compact, rigid structure obtainable by the overlap between the crankpin 4ª and the side shafts 28 and by counterboring the crankcheeks at 27 for the eccentric bearings. The Woodruff keyseat 29 and the threads 30 at each end of the crank are provided for retaining the pinions 7ª on the auxiliary crank.

The main eccentric consists of two halves as shown in Figures 5 and 6. Each half contains an inner race 24 for the bearing that is recessed in the counterbore 27 and an outer race 31 for the bearing that carries the pinion 7ª. The periphery of the eccentric provides the inner race 34 for the ball bearing of which 22 is the outer race. The complete eccentric comprises two halves assembled with the inner race 24 of one half concentric with the outer race 31 of the other half, bolted together with two screws 32 and alined with two hollow dowels 33, to form one member of a two-row ball bearing. The eccentric carries one end each, of the two adjacent auxiliary cranks, which rotate about the axes 3ª. The counterbore 35 provides room for the pinion 7ª.

Figure 7:
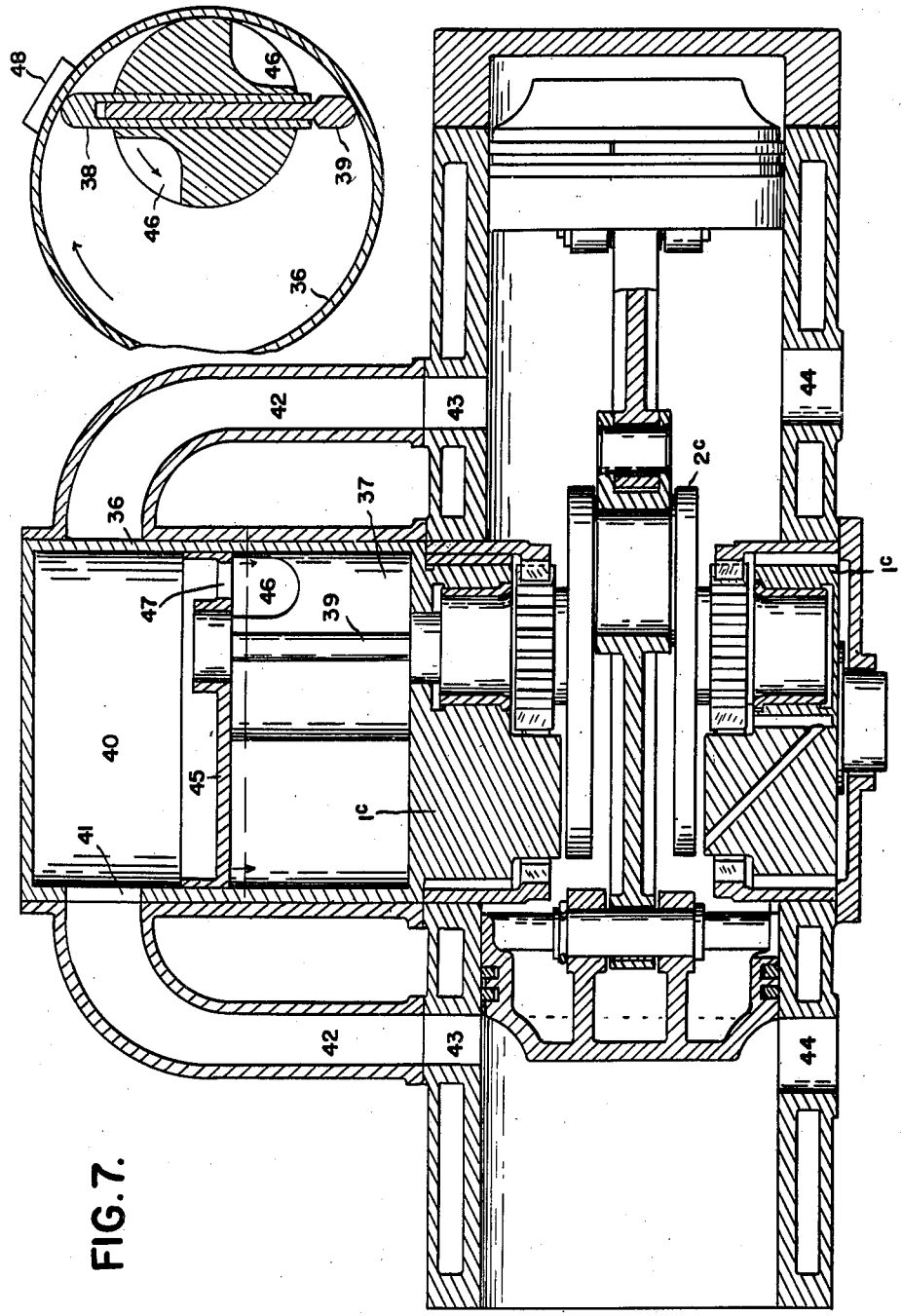
Figure 7 is a longitudinal section of a two-cylinder two-cycle engine with opposed cylinders and scavenging blower taken in the plane of the cylinder and crank axes.

The twin-cylinder two-cycle engine shown in Figure 7 includes essentially the same crank, piston, and connecting rod mechanism as that just described, with such minor differences as are dictated by the nature of the power plant. In this embodiment of the invention, the eccentric 1ᶜ and the auxiliary crank 2ᶜ may be included in the design of a scavenging blower which has an effective speed double crankshaft speed and which also acts as a distributor for the scavenging air.

In this adaptation, a rotary vane-type blower consisting of a sleeve 36 mounted on the eccentric 1ᶜ, and a rotor 37 mounted on the auxiliary crank 2ᶜ turn at equal speed in opposite directions, whence their relative speed is double the speed of either one of them. The rotor carries a diametrical sliding telescoping vane consisting of the blades 38 and 39 which maintain contact with the inner wall of sleeve 36. The capacity of the blower is sufficient to maintain air pressure in the chamber 40 for effectively scavenging and charging each cylinder in turn while the piston is near the crank end limit of its travel. The scavenging air is distributed to the proper cylinder through the port 41 in the rotating sleeve 36 and thence through the passages 42 and the scavenging ports 43 in the cylinder walls. The products of combustion are discharged through the ports 44.

The scavenging blower is separated from the air chamber 40 by the head 45 through which the air from the blower flows by means of the passages 46 and the port 47. Scavenging air is admitted to the blower through the inlet port 48.

The advantage of this crank and blower assembly is that it permits 180-degree firing intervals in a twin-cylinder two-cycle engine with opposed cylinders, provides an excess of air for adequate scavenging and charging as compared with an engine that depends upon crankcase compression, removes the need for a long piston to seal the cylinder wall ports, and gives a perfectly balanced and exceptionally compact engine, with mechanical simplicity.

Although I have illustrated and discussed only two representative designs to which my mechanism may be applied, it is evident that the flexibility of the conception permits a wide variety of adaptations without departing from the spirit of the invention.

I claim:

1. In means for converting reciprocating motion into rotary motion, a fixed internal gear, a main eccentric mounted for rotation in bearings concentric with said gear, an auxiliary crank mounted for rotation within said eccentric and provided with a gear meshing with said internal gear, a reciprocating member connected in operative relation to said auxiliary crank, and a counterweight on said crank having its centroid at substantially the crankpin distance from the axis of rotation of said crank and having a mass substantially equal to the mass of the reciprocating parts.

2. In means for converting reciprocating motion into rotary motion in accordance with claim 1, a counterweight fixed to said main eccentric.

3. In an internal combustion engine, main crank means, auxiliary crank means mounted rotatably upon said main crank means at the location of the crank pin thereof and having a radius equal to the distance of said crank pin location from the axis of rotation of said main crank means, a guide element reciprocable in a line normal to said axis of rotation and operatively connected to said auxiliary crank means, counterweight means upon said auxiliary crank means substantially counterbalancing the weight of the reciprocating parts, and means for constraining said auxiliary crank means to a motion wherein its axis of rotation travels in an orbit around the axis of rotation of said main crank means.

4. In an internal combustion engine a rotatable driven element, a reciprocable driving element, an intermediate rotatable element connected at its axis to said driven element in driving relation thereto, means connecting the reciprocable driving element to said intermediate element whereby to rotate the latter, means for causing said intermediate element during rotation to move in an orbit around the axis of rotation of the driven element, and counterbalancing means carried by said intermediate element for substantially balancing the weight of said reciprocating element.

5. In an internal combustion engine, main crank means, auxiliary crank means mounted rotatably upon said main crank means at the location of the crank pin thereof and having a radius equal to the distance of said crank pin location from the axis of rotation of said main crank means, a guide element reciprocable in a line normal to said axis of rotation and operatively connected to said auxiliary crank means, counterweight means upon said auxiliary crank means substantially counterbalancing the weight of the reciprocating parts, and located at crank pin distance from the axis of rotation, and means for constraining said auxiliary crank means to a motion wherein its axis of rotation travels in an orbit around the axis of rotation of said main crank means.

6. In an internal combustion engine a rotatable driven element, a reciprocable driving element, an intermediate rotatable element connected at its axis to said driven element in driving relation thereto, means connecting the reciprocable driving element to said intermediate element whereby to rotate the latter, means for causing said intermediate element during rotation to move in an orbit around the axis of rotation of the driven element, and counterbalancing means carried by said intermediate element for substantially balancing the weight of said reciprocating element, said counterbalancing means being located opposite to and at the same distance from the axis of rotation as is the connection to the reciprocable driving element.

7. In means for coordinating reciprocating motion, with rotary motion, a fixed internal gear, a main eccentric mounted for rotation in bearings concentric with said gear, an auxiliary crank mounted for rotation within said eccentric and provided with a gear meshing with said internal gear, which has a pitch circle half as great as that of the internal gear, a reciprocating member connected in operative relation to said auxiliary crank, a counterweight on said auxiliary crank having its centroid at substantially the crankpin distance from the axes of rotation of said crank so that the centroid of the counterweight describes a path identical to the path of the auxiliary crankpin but at right angles thereto, said counterweight having a mass substantially equal to the mass of the reciprocating parts.

8. In means for coordinating reciprocating motion with rotary motion in accordance with claim 7, a counterweight fixed to said main eccentric.

9. In a device having a reciprocating part and a rotating part and in which the movement of one of said parts provides the movement of the other, a counterweight movable back and forth in a path at right angles to the path of the reciprocating part, the mass of said counterweight being equal to the mass of the reciprocating part, the movement of said counterweight being so timed that its maximum speed coincides with the minimum speed of said reciprocating part, and its minimum speed coincides with the maximum speed of the reciprocating part, whereby the total kinetic energy of the two remains constant.

HARRY A. HUEBOTTER.